United States Patent [19]

Parker

[11] Patent Number: 4,871,628
[45] Date of Patent: Oct. 3, 1989

[54] BATTERY TERMINAL POST PROTECTOR

[76] Inventor: David H. Parker, 2255 Jefferson St., Torrance, Calif. 90501

[21] Appl. No.: 257,838

[22] Filed: Oct. 14, 1988

[51] Int. Cl.[4] .................. H01M 2/10; H01M 6/42
[52] U.S. Cl. .................................. 429/96; 429/99; 429/157; 429/158
[58] Field of Search .............. 429/96, 99, 100, 157, 429/158

[56] References Cited

U.S. PATENT DOCUMENTS

| | | | |
|---|---|---|---|
| 1,887,811 | 11/1932 | Ikin | 429/99 |
| 2,681,982 | 6/1954 | Seegrist | 429/96 X |
| 3,923,549 | 12/1975 | Mabuchi et al. | 429/158 X |
| 3,930,889 | 1/1976 | Ruggiero et al. | 129/97 |
| 4,593,461 | 6/1986 | Thiele et al. | 429/100 X |

*Primary Examiner*—Stephen J. Kalafut
*Attorney, Agent, or Firm*—Matthew P. Lynch

[57] ABSTRACT

A resilient disc to be located between batteries which are mounted within a battery operated device. If the batteries incur an unusual shock, such as when the device is dropped or thrown, this resilient disc functions to absorb enough of the shock to protect the battery terminal post from being damaged and hence make the batteries inoperative.

2 Claims, 1 Drawing Sheet

BATTERY TERMINAL POST PROTECTOR

BACKGROUND OF THE INVENTION

The field of this invention relates to a protection device and more particularly to a protector for batteries which are mounted within a battery operated device to protect the terminal posts of the battery from damage upon the device incurring an unusual shock.

The use of battery operated devices are exceedingly common. Common examples of such devices are radios, flashlights, stereos, and the like.

These devices are readily portable and are designed to be easily carried by a human being. As a result, these devices run the risk of being accidentally dropped. It is common that when such a device is dropped that it will not operate. Frequently, this operation has to do with battery failure. The reason the batteries have failed has to do with the shock which has caused the in-line series of batteries to disengage from one another and then re-engage with such force that one or more of the battery terminal posts become cracked. Therefore, the electrical series arrangement of the in-line series of batteries is now broken and it is necessary to discover and replace the inoperative battery or batteries.

SUMMARY OF THE INVENTION

It has been found that upon a battery operated device incurring an unusual shock, if there was some type of device that prevented the batteries from "slamming together" after they had slightly separated due to the shock, that the battery terminal posts of the battery would be protected and most often not incur any damage. For this purpose, the present invention has to do with the incorporating of a plastic foam disc about the battery terminal posts of each battery. This disc is readily squeezable to permit electrical contact with its respective battery terminal post. However, upon slight separation of the batteries occurring, the disc will immediately expand and during re-squeezing of the disc absorb shock to thereby prevent damage to the battery terminal post. A plastic foam composition is preferred for the material of the disc. The disc is to be adhesively secured to the front face of each battery around the battery terminal post.

The primary objective of the present invention is to construct a device which protects the battery terminal post with an in-line series of batteries from damage upon a battery operated device incurring an unusual shock.

Another objective of the present invention is to construct a protector for a battery terminal post which can be manufactured inexpensively and therefore sold inexpensively.

DETAILED DESCRIPTION OF THE SHOWN EMBODIMENT

Figure 1:
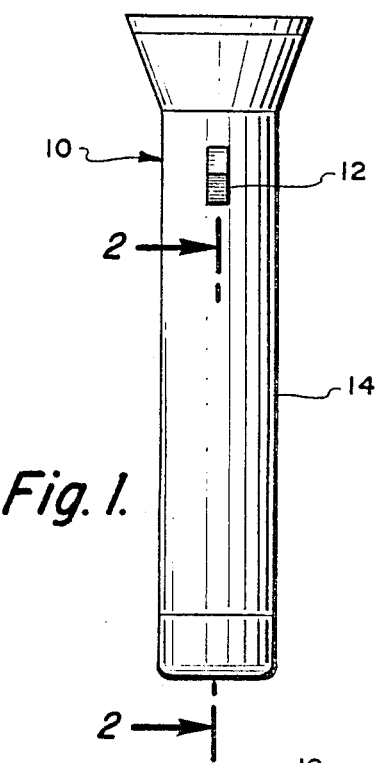
FIG. 1 is a side elevational view of a typical battery operated device within which the battery terminal post protector of this invention is incorporated.
Figure 2:
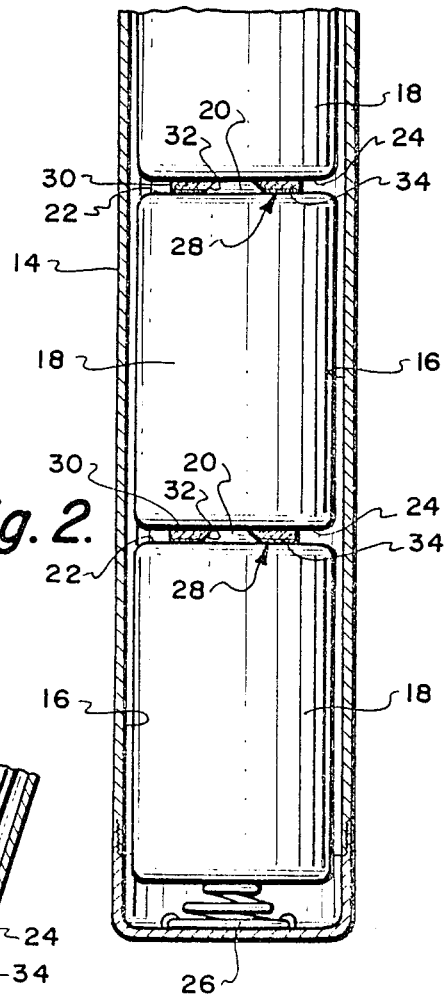
FIG. 2 is a longitudinal cross-sectional view through the battery compartment of the battery operated device of FIG. 1 taken along line 2—2 of FIG. 1.

Referring particularly to the drawing, there is shown a battery operated device in the form of a flashlight 10 which is to be operated electrically by switch 12. The switch 12 is mounted on the exterior surface of a housing 14. The housing 14 is hollow including an interior battery compartment 16. Within the battery comapartment 16 is mounted a plurality of batteries 18 located in an in-line manner.

Each battery 18 incldues an anode in the form of a battery terminal post 20. The battery terminal post 20 is mounted on the front face 22 of its respective battery 18. Each battery has a back face 24. The back face 24 of the last in line of the batteries 18 abuts against a spring 26. The spring 26 is fixedly mounted onto the wall of the compartment 16.

Figure 3:
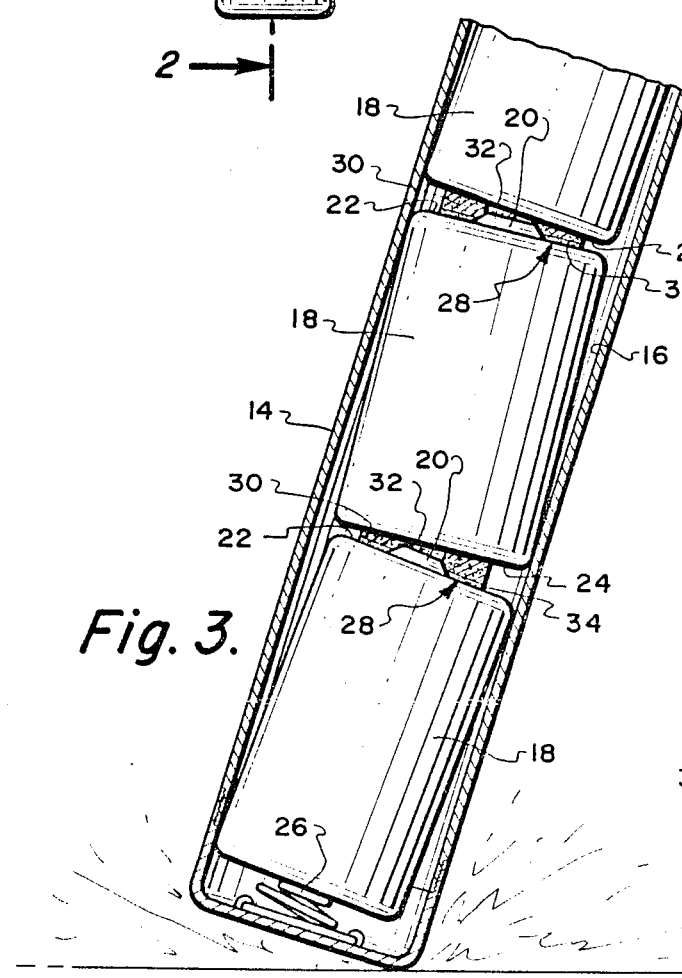
FIG. 3 is a longitudinal cross-sectional view similar to FIG. 2 but depicting the device, a flashlight, being dropped and thereby incurring an unusual shocking force.
Figure 4:
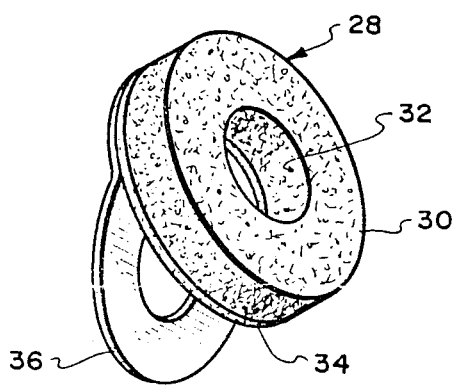
FIG. 4 is a isometric view of the battery terminal post protection of this invention.

It is to be noted that a terminal post 20 of a battery 18 abuts against the back face 24 of the next succeeding battery 18. In this manner, an electrically series connection is established which will activate the flashlight 10. If the flashlight 10 is dropped, as is shown in FIG. 3, the spring 26 will become compressed and each of the battery terminal posts 20 will disconnect from the back face 24 of its next succeeding in line battery 18. The spring 26 will then re-expand to its initial position with such force that it is common that one or more of the battery terminal posts 20 will crack by being slammed hard into the back face 24 of the battery in which it is in contact with. As a result, the electrical connection is now broken which requires that that damaged battery 18 is to be discovered and replaced.

In order to prevent this damage from incurring, there is utilized the protector 28 of this invention. The protector 28 is formed of a body 30 in the form of a disc. The body 30 has a central opening 32. The back face of the body 30 includes a layer of adhesive 34. This adhesive is protected by a release paper 36 prior to usage of the protector 28.

Prior to installation of the battery 18 within the battery compartment 16, the release paper 36 is removed from the protector 28 and the body 30 of the disc is located about the terminal post 20 of a battery 18 with post 20 located within central opening 32. The adhesive 34 will secure the body 30 in place onto the front face 22. It is to be understood that there will be a separate protector 28 for each terminal post 20 of each battery 18.

The body 30 is constructed of a plastic foam material. This plastic foam material is readily compressible. The height of the protector 28 is chosen so that it will be partially compressed when located between a front face 22 and a back face 24.

Upon the flashlight/device 10 incurring a shock as shown in FIG. 3 and the spring 26 becomes compressed, the batteries 18 slightly separate. During this separation, the protector 28 expands to its normal at-rest position. After the shock has dissipated, the spring 26 will re-expand and then move the batteries 18 into tight connection with each other. However, this re-expansion movement is slowed somewhat because the protectors 28 must be recompressed. This recompression occurs in only a portion of a second, but it is sufficient to absorb enough of the force pushing the batteries to tight connection that the terminal posts 20 are protected and will not be damaged.

What is claimed is:

1. In combination with a battery operated device, said device having a battery compartment, a pair of batteries mounted in an in-line position within said battery compartment, one said battery having a front face, a battery terminal post mounted on said front face, the other said battery having a rear face constituting a battery terminal connection, said terminal post to be in tight contact with said battery terminal connector, the improvement comprising:

a protector comprising a resilient member located directly adjacent said battery terminal post, said resilient member being snugly held in position between said front face and said rear face, said resilient member comprising a disc, said disc surrounding said battery terminal post, said disc including an adhesive on one said surface, said adhesive to facilitate attachment of said disc to said front face, whereby upon said battery operated device incurring an exterior shock force that could possibly damage said battery terminal post the said resilient member absorbs enough of the shock transmitted to said battery terminal post to minimize the chance of damage to said battery terminal post and make such inoperative.

2. The combination as defined in claim 1 wherein: said disc being constructed of a plastic foam material.

* * * * *